(12) United States Patent
Kobiki et al.

(10) Patent No.: US 11,946,828 B2
(45) Date of Patent: Apr. 2, 2024

(54) SIDE CRASH TEST APPARATUS AND SIDE CRASH TEST CONDITION DETERMINATION METHOD FOR CENTER PILLAR OF AUTOMOBILE

(71) Applicant: JFE STEEL CORPORATION, Tokyo (JP)

(72) Inventors: Hideaki Kobiki, Tokyo (JP); Kentaro Sato, Tokyo (JP); Tsuyoshi Shiozaki, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 323 days.

(21) Appl. No.: 17/615,618

(22) PCT Filed: Feb. 14, 2020

(86) PCT No.: PCT/JP2020/005772
§ 371 (c)(1),
(2) Date: Dec. 1, 2021

(87) PCT Pub. No.: WO2020/246071
PCT Pub. Date: Dec. 10, 2020

(65) Prior Publication Data
US 2022/0090989 A1    Mar. 24, 2022

(30) Foreign Application Priority Data

Jun. 7, 2019  (JP) .................................. 2019-106847
Nov. 20, 2019 (JP) .................................. 2019-209316

(51) Int. Cl.
*G01M 17/00*  (2006.01)
*B62D 25/04*  (2006.01)
*G01M 17/007* (2006.01)

(52) U.S. Cl.
CPC ......... *G01M 17/0078* (2013.01); *B62D 25/04* (2013.01)

(58) Field of Classification Search
CPC .................................................. G01M 17/0078
See application file for complete search history.

(56) References Cited

U.S. PATENT DOCUMENTS 10,753,826 B2    8/2020  Ito et al.
2016/0290894 A1*  10/2016  Ito ..................... G01M 17/0078
(Continued)

FOREIGN PATENT DOCUMENTS

JP    2006-281964 A    10/2006
JP    2015-004627 A    1/2015
(Continued)

OTHER PUBLICATIONS

Apr. 14, 2020 International Search Report issued in International Patent Application No. PCT/JP2020/005772.
(Continued)

*Primary Examiner* — Jill E Culler
*Assistant Examiner* — Ruben C Parco, Jr.
(74) *Attorney, Agent, or Firm* — Oliff PLC

(57)            ABSTRACT

A side crash test apparatus uses a crash test structure including a center pillar, a roof-rail simulated part, and a rocker simulated part, and includes: a striker; a roof rail support; and a rocker support. The rocker support includes a rocker-rotation braking mechanism configured to restrain translation of the rocker simulated part, and support the rocker simulated part to be rotatable about an axis thereof and allow braking of the rotation. The rocker-rotation braking mechanism includes a rocker-rotation support member configured to rotate about the axis together with the rocker simulated part, a rocker-rotation shaft support configured to support a rotation center of the rocker-rotation support
(Continued)

member, a rocker-rotation braking plate extended by rotation of the rocker-rotation support member while braking the rotation when the striker crashes into the center pillar, and a rocker rotation braking plate fixed portion configured to fix another end side of the rocker-rotation braking plate.

5 Claims, 7 Drawing Sheets

(56) References Cited

U.S. PATENT DOCUMENTS

2017/0350791 A1   12/2017  Belwafa et al.
2022/0050021 A1*  2/2022  Sato .................. G01M 17/0078

FOREIGN PATENT DOCUMENTS

| JP | 2016-061725 A | 4/2016 |
| JP | 2016-075489 A | 5/2016 |
| JP | 2016-193709 A | 11/2016 |
| JP | 6070862 B2 | 2/2017 |
| JP | 2023127895 A * | 9/2023 |
| KR | 10-2018-0077924 A | 7/2018 |
| KR | 102331374 B1 * | 12/2021 |

OTHER PUBLICATIONS

May 31, 2022 extended Search Report issued in European Patent Application No. 20818196.6.

* cited by examiner (a)

(b)

SIDE CRASH TEST APPARATUS AND SIDE CRASH TEST CONDITION DETERMINATION METHOD FOR CENTER PILLAR OF AUTOMOBILE

FIELD

The present invention relates to a side crash test apparatus and a side crash test condition determination method for a center pillar of an automobile (automotive center pillar).

BACKGROUND

In recent years, strict collision safety has been required for automobiles, and in commercially available automobiles, various crash tests have been conducted by using an actual vehicle (hereinafter referred to as "real vehicle"). At the development stage of automobiles, a prototype vehicle is fabricated and the performance such as collision safety is confirmed by the crash test thereof. But if desired crashworthiness is not satisfied, a prototype vehicle with improvement is fabricated and the crash test is conducted again. Such refabrication of a prototype vehicle and retest thereof may be repeated a plurality of times until the desired crashworthiness is satisfied, which has caused problems such as an increase in development cost and a delay in the development schedule.

In order to avoid such problems, prior to conducting the fabrication of a prototype vehicle and the evaluation of crashworthiness by the crash test thereof, it is effective, by conducting a crash test simulating the crash of the real vehicle using as a test target a structural member that is a region to be damaged in a crash test using a real vehicle out of the structural members constituting a body frame, or a structure composed of the aforementioned structural member and other structural members around the structural member, to examine the crashworthiness of such a structural member or a structure. In addition, before conducting the crash test using such a structural member or a structure, in some cases, the crashworthiness thereof may be examined by a finite element method (FEM) analysis the analysis target of which is the structural member or the structure. In these examinations, it is important that, in the development of the body frame of the automobile, the crash test or the FEM analysis of the structural member or the structure is conducted under the condition in which the phenomena that arise in the crash test of the prototype vehicle can be reproduced as much as possible.

Of the crash tests of automobiles, a side crash test assuming that, into a side of a vehicle, another vehicle crashes, uses a crash test structure having a center pillar located at a position into which the other vehicle crashes and a roof rail and a rocker that support the center pillar, so that the side crashworthiness of the center pillar is evaluated. Then, the side crash tests are conducted by changing the shape and the composition of the material (material strength, thickness, and the like) of the center pillar, and the side crashworthiness is evaluated based on the results of the tests thereof, thereby developing the center pillar that satisfies the desired side crashworthiness. In the side crash test using such a crash test structure, in a state where the front ends and the rear ends of the roof rail and the rocker in the vehicle longitudinal direction are each fixed or semi-fixed, many methods in which a striker simulating the other vehicle is made to crash into a predetermined position of the center pillar are employed.

For example, Patent Literature 1 discloses a method of measuring, in an impact test using a structure composed of a side sill (rocker) and a center pillar that are frame members of an automobile, the energy absorbed in each of the side sill and the center pillar. In this method, by fixing both ends of the side sill in the longitudinal direction, the impact test is conducted in a state where the displacement of both ends of the side sill is restrained.

In addition, Patent Literature 2 discloses a method of evaluating side crashworthiness of an automotive center pillar structure by the FEM analysis of the automotive center pillar structure simulating the time of side crash. In this FEM analysis, as boundary conditions, a complete restraint condition is given to the upper end part joined to the roof rail, and further, a restraint condition that allows free rotation is given to the lower end part joined to the rocker.

Moreover, Patent Literature 3 focuses on the point that a side sill and a roof rail are plastically deformed (torsional deformation and bending deformation) in a crash test in which, with a center pillar assembly having a center pillar, a part of the side sill (rocker) extending in the front-rear direction from the lower end of the center pillar, and a part of the roof rail extending in the front-rear direction from the upper end of the center pillar as a test piece, an impact is applied to the center pillar from the side by a striker that moves in the horizontal direction, and Patent Literature 3 discloses a technique that supports each of both ends of the side sill and the roof rail by a test-piece support jig that is composed of a plurality of shape steels and for which the transverse section is an open cross-section or in a cruciform. Then, according to this technique, it is said that, by forming a cross-sectional gradual change part on a part of the test-piece support, it is possible to adjust the rigidity of the test-piece support and to accurately evaluate the side crashworthiness of the center pillar.

CITATION LIST

Patent Literature

Patent Literature 1: Japanese Patent Application Laid-open No. 2015-004627
Patent Literature 2: Japanese Patent Application Laid-open No. 2016-193709
Patent Literature 3: Japanese Patent No. 6070862

SUMMARY

Technical Problem

In a side crash test using a real vehicle of an automobile, in the center pillar of the real vehicle, a large number of phenomena in which the lower portion of the center pillar bends or buckles toward the inside of the vehicle are observed, and at the same time, in the rocker of the real vehicle, deformation that involves rotation including torsion or the like is observed in addition to breakage including bending or the like. Therefore, even in the side crash test using a structure having a center pillar, it needs to reproduce the same phenomenon as the real vehicle.

Thus, the inventors conducted the FEM analysis of side crash test, using as an analysis target a crash test structure 100 having a center pillar 101, a roof-rail simulated part 103 connected to the upper end of the center pillar 101, and a rocker simulated part 105 connected to the lower end of the center pillar 101 as illustrated in FIG. 2, in which a striker is made to crash into the side of the center pillar 101.

According to the result of the FEM analysis, they have enthusiastically examined to what extent the phenomenon and the side crashworthiness in the side crash test using the crash test structure 100 have reproduced the phenomenon and the side crashworthiness in the crash test using the real vehicle.

First, as disclosed in Patent Literature 1, when the FEM analysis was conducted while both end portions of the rocker simulated part 105 of the crash test structure 100 in the longitudinal direction (vehicle longitudinal direction in FIG. 2) are completely restrained, it was found that the lower portion of the center pillar 101 was crushed by the striker and the deformation was different from the phenomenon for which the lower portion of the center pillar was bent or buckled as seen in the side crash test of the real vehicle.

As disclosed in Patent Literature 2, when the FEM analysis was conducted while both end portions in the vehicle longitudinal direction of the rocker simulated part 105 for which translation is restrained are free to rotate, the lower portion of the center pillar 101 was greatly bent or buckled, as with the side crash test of the real vehicle. However, it was found that the rotation angle of the rocker simulated part 105 around the axis was large, and depending on the structure of the center pillar 101, a destructive phenomenon which is different from the side crash test of the real vehicle may arise. Moreover, a problem was found that, if both end portions of the rocker simulated part 105 are restrained to freely rotate, there are differences such as fracture did not arise at the region where the fracture arose in the side crash test of the real vehicle and the fracture arose at another region, and a destructive phenomenon that arises in the real vehicle may be not possible to predict accurately.

In this regard, as disclosed in Patent Literature 3, it was considered that, when the roof-rail simulated part 103 and the rocker simulated part 105 of the crash test structure 100 are supported by a support jig having the torsional rigidity and bending rigidity equivalent to those of the roof rail and the rocker of the real vehicle, it is possible to more closely reproduce the destructive phenomenon that arises in the side crash test of the real vehicle. However, it is necessary to accumulate a lot of knowledge and experience in selecting a cross-sectional shape of such a support jig and designing of the shape of the cross-sectional gradual change part formed at a part, and it took a lot of labor and cost to create an analysis model to confirm the effect thereof, execute FEM analyses, and the trial and error in the actual tests.

The present invention has been made to solve the above-described problems and an object of the present invention is to provide a side crash test apparatus and a side crash test condition determination method for a center pillar of an automobile, being capable of reproducing the destructive phenomenon of the center pillar that arises in the side crash test of a real vehicle by a simpler mechanism and simpler condition adjustment.

Solution to Problem

A side crash test apparatus according to the present invention for a center pillar of an automobile conducts a side crash test of the center pillar using a crash test structure including: the center pillar of the automobile; a roof-rail simulated part connected to an upper end of the center pillar and simulating a roof rail of the automobile; and a rocker simulated part connected to a lower end of the center pillar and simulating a rocker of the automobile, and includes: a striker configured to crash into a side of the center pillar; a roof rail support configured to support each of a front end and a rear end of the roof-rail simulated part; and a rocker support configured to support each of a front end and a rear end of the rocker simulated part, wherein the rocker support includes a rocker-rotation braking mechanism configured to restrain, when the striker crashes into the center pillar, translation of the rocker simulated part, and support the rocker simulated part to be rotatable about an axis thereof and allow braking of the rotation, and the rocker-rotation braking mechanism includes a rocker-rotation support member attached to an end face of the rocker simulated part, configured to rotate about the axis together with the rocker simulated part, and having an arc surface formed on at least a part of an outer face, a rocker-rotation shaft support configured to support a rotation center of the rocker-rotation support member to be rotatable while restraining translation thereof, a rocker-rotation braking plate for which one end side is attached to the outer face of the rocker-rotation support member and that is arranged along a tangential direction of the arc surface and, when the striker crashes into the center pillar, is extended by rotation of the rocker-rotation support member while braking the rotation and is wound around the arc surface, and a rocker-rotation braking plate fixed portion configured to fix another end side of the rocker-rotation braking plate.

The roof rail support may include a roof-rail rotation braking mechanism configured to restrain, when the striker crashes into the center pillar, translation of the roof-rail simulated part and to support the roof-rail simulated part to be rotatable about an axis thereof and allow braking of the rotation, and the roof-rail rotation braking mechanism may include a roof-rail rotation support member attached to an end face of the roof-rail simulated part, configured to rotate about the axis together with the roof-rail simulated part, and having an arc surface formed on at least a part of an outer face, a roof-rail rotation shaft support configured to support a rotation center of the roof-rail rotation support member to be rotatable while restraining translation thereof, a roof-rail rotation braking plate for which one end side is attached to the outer face of the roof-rail rotation support member and that is arranged along a tangential direction of the arc surface and, when the striker crashes into the center pillar, is extended by rotation of the roof-rail rotation support member while braking the rotation and is wound around the arc surface, and a roof-rail rotation braking plate fixed portion configured to fix another end side of the roof-rail rotation braking plate.

At least one of material property, shape, and dimensions of the roof-rail rotation braking plate in the roof-rail rotation braking mechanism may be made different on a front end side and a rear end side of the roof-rail simulated part.

At least one of material property, shape, and dimensions of the rocker-rotation braking plate in the rocker-rotation braking mechanism may be made different on a front end side and a rear end side of the rocker simulated part.

A side crash test condition determination method according to the present invention for the center pillar of the automobile that determines material property, shape, and dimensions of the rocker-rotation braking plate used in the side crash test apparatus for the center pillar of the automobile as test conditions, includes: a vehicle-model creation step of creating a vehicle model that modeled the automobile; a vehicle-model side crash analysis step of, by performing side crash analysis in which a striking body crashes into the side of the center pillar from a side of the vehicle model, acquiring a rotation angle around the axis of the rocker of the automobile in the vehicle model by the side crash analysis; a side-crash test model creation step of creating a side-crash test model that modeled the crash test structure and the side crash test apparatus; a rotation-braking plate setting step of setting material property, shape, and dimensions of the rocker-rotation braking plate in the side-crash test model; a side-crash test model analysis step of, by performing side crash analysis in which a striker crashes into the center pillar of the side-crash test model, acquiring a rotation angle of the rocker simulated part; a rotation-angle comparison step of comparing the rotation angle of the rocker acquired at the vehicle-model side crash analysis step with the rotation angle of the rocker simulated part acquired at the side-crash test model analysis step; a repetition step of repeatedly performing the rotation-braking plate setting step, the side-crash test model analysis step, and the rotation-angle comparison step, until the rotation angles compared at the rotation-angle comparison step are in a predetermined range by changing the material property, shape, and dimensions of the rocker-rotation braking plate; and a test-condition determination step of determining, as test conditions, the material property, shape, and dimensions of the rocker-rotation braking plate in a case where the compared rotation angle of the rocker simulated part and the rotation angle of the rocker are in the predetermined range at the repetition step.

Advantageous Effects of Invention

According to the present invention, it is possible to apply braking to the rotation of the rocker simulated part when the striker crashed into the side of the center pillar, to reproduce the destructive phenomenon of the center pillar that arises in the side crash test of a real vehicle more accurately by a simple mechanism and simple condition adjustment, to examine and select the structure and material of the center pillar by small-scaled tests, and to make the development of the body frame structure efficient by reducing the number of structural reviews with real vehicles.

DESCRIPTION OF EMBODIMENTS

In recent years, due to the strengthening of collision safety performance required for automobiles, high-strength steel sheets have been applied to the center pillars, and the strength has been drastically improved. At the same time, the high-strength steel sheets have also been applied to the roof rails and the rockers that support the center pillars, drastically improving the strength. Therefore, the deformation of the center pillar in the side crash test of the real vehicle for which the high-strength steel sheet is used for the center pillar is in a state where, along with the suppression of deformation of the roof rail and the rocker, the fracture in the lower portion near the portion connected to the rocker is unlikely to arise.

Figure 2:
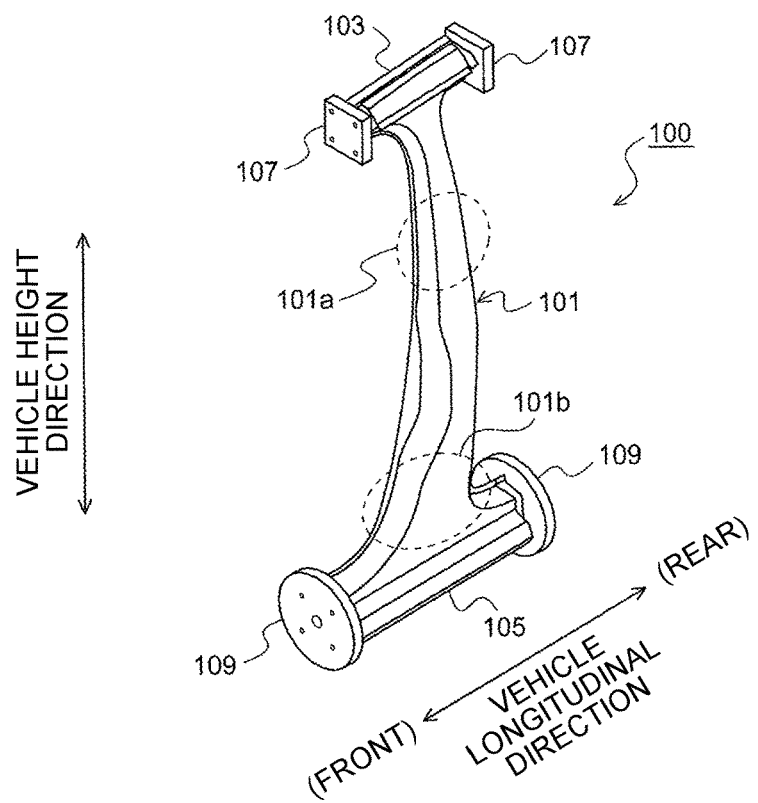
FIG. 2 is a diagram illustrating a crash test structure to be a subject of a side crash test in the present invention.

Meanwhile, as in the foregoing, in the side crash test of the center pillar 101 using the crash test structure 100 as illustrated in FIG. 2, when both end portions of the rocker simulated part 105 for which the translation is restrained are freely rotated as in the technique disclosed in Patent Literature 2, the rotation of the rocker simulated part 105 was excessive, and the fracture phenomenon of the center pillar 101 arose with the preceding fracture of a lower portion 101b and no fracture arose in an upper portion 101a, which was significantly different from the fracture phenomenon of the center pillar in the side crash test of the real vehicle.

Thus, the inventors enthusiastically examined measures capable of successfully reproducing the fracture phenomenon of the center pillar in the side crash with the real vehicle, in the side crash test of the center pillar 101 using the crash test structure 100 as illustrated in FIG. 2. As a result, it was conceived that, in addition to supporting the rocker simulated part 105 for which the translation is restrained to be rotatable, it is sufficient to provide a mechanism capable of applying braking to the rotation and support both end portions of the rocker simulated part 105. Moreover, the measures that simply apply braking to the rotation of the rocker simulated part 105 and allow the braking to be easily adjusted were further examined.

Prior to explaining embodiments of the present invention, a crash test structure having a center pillar to be the target of the side crash test in the present invention will be described in the following. In the present specification and the drawings, the center pillar is described to be arranged in a standing state so that the posture of the center pillar in the side crash test is the same as the posture of the center pillar in the real vehicle of an automobile, but the posture and arrangement of the center pillar are not limited thereto in the present invention. Thus, the terms describing the positions and directions such as "upper end", "lower end", "side", "front end", and "rear end" in the present invention represent relative positions and directions (vehicle vertical direction, vehicle width direction, and vehicle longitudinal direction) in reference to the posture and arrangement of the center pillar in the real vehicle of the automobile, not representing the absolute positions and directions in reference to the posture and arrangement of the center pillar in the side crash test. Furthermore, in the present specification and the drawings, elements having a substantially identical function and configuration are denoted by identical reference signs.

Crash Test Structure

The crash test structure 100 has, as illustrated in FIG. 2 as an example, the center pillar 101 of the automobile, the roof-rail simulated part 103 connected to the upper end of the center pillar 101, and the rocker simulated part 105 connected to the lower end of the center pillar 101.

The roof-rail simulated part 103 simulates the roof rail of the real vehicle of an automobile and is obtained by cutting the roof rail at a plane perpendicular to the vehicle longitudinal direction in front and rear of the portion connected to the upper end of the center pillar 101. At the front end and the rear end of the roof-rail simulated part 103, fixing plates 107 are joined, as members for attaching it to a side crash test apparatus for a center pillar of an automobile which will be described later. The roof-rail simulated part 103 may be a cutout of the roof rail of the real vehicle.

The rocker simulated part 105 simulates the rocker of the real vehicle of an automobile and is obtained by cutting the rocker at a plane perpendicular to the vehicle longitudinal direction in front and rear of the portion connected to the lower end of the center pillar 101. At the front end and the rear end of the rocker simulated part 105, discs 109 are joined, as members for attaching it to the side crash test apparatus for a center pillar of an automobile which will be described later. The rocker simulated part 105 may be a cutout of the rocker of the real vehicle.

First Embodiment

Figure 1:
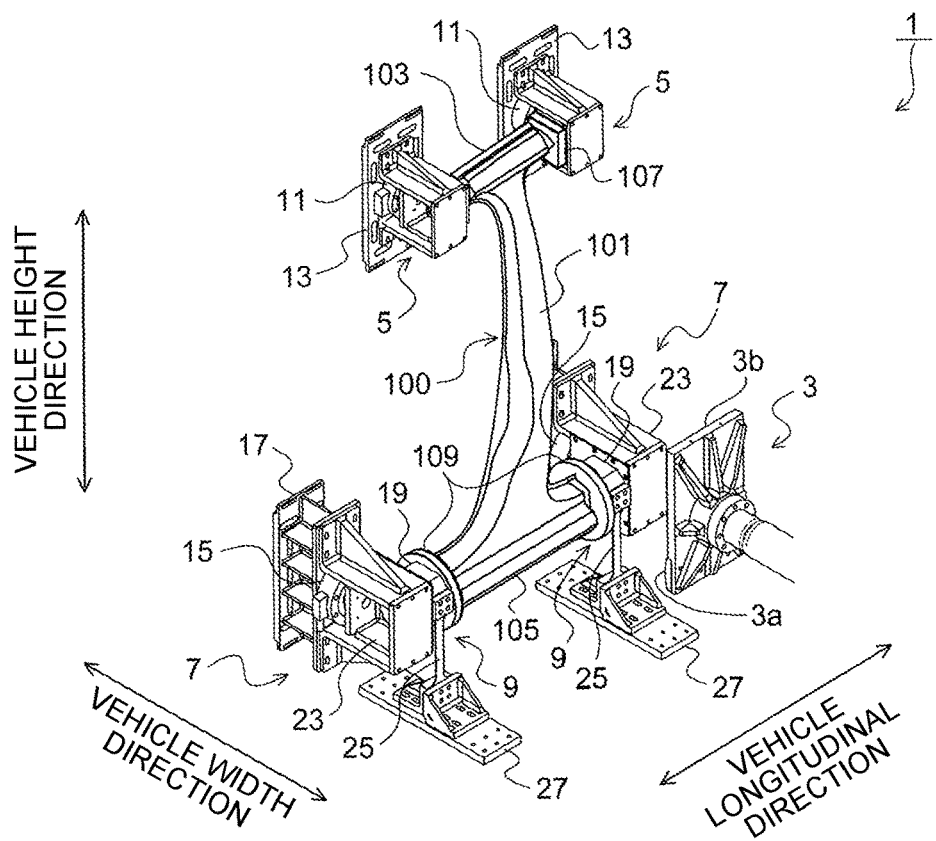
FIG. 1 is a diagram illustrating a configuration of a side crash test apparatus for a center pillar of an automobile according to a first embodiment of the present invention.
Figure 3:
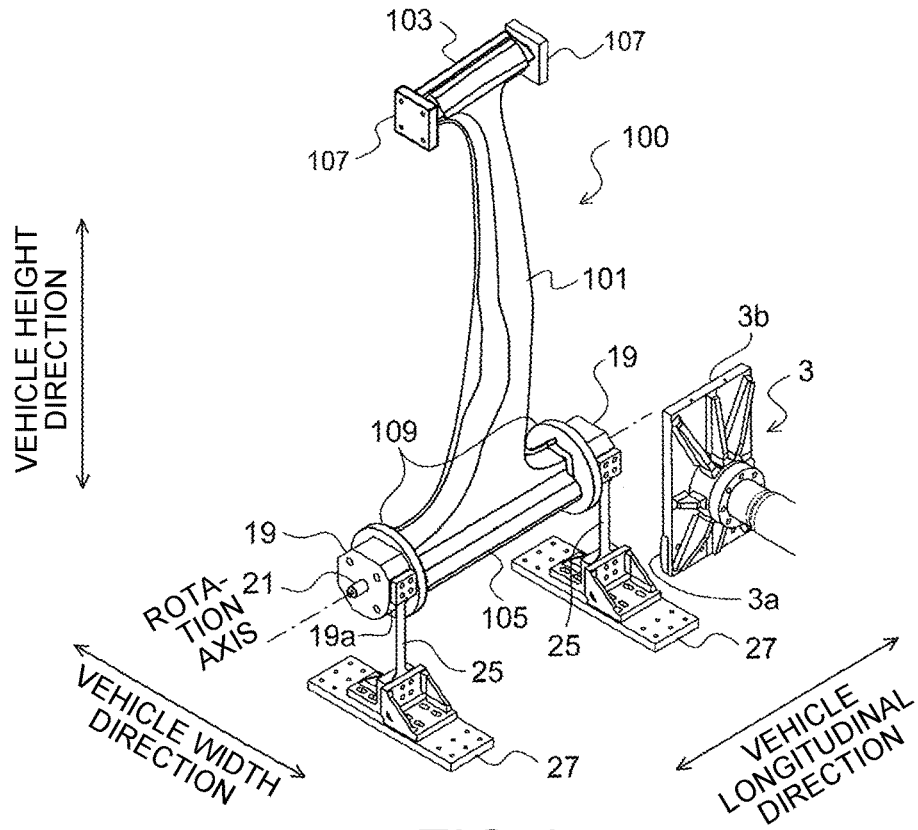
FIG. 3 is a diagram for explaining the configuration of the side crash test apparatus for a center pillar of an automobile according to the first embodiment of the present invention (Part 1).
Figure 4:
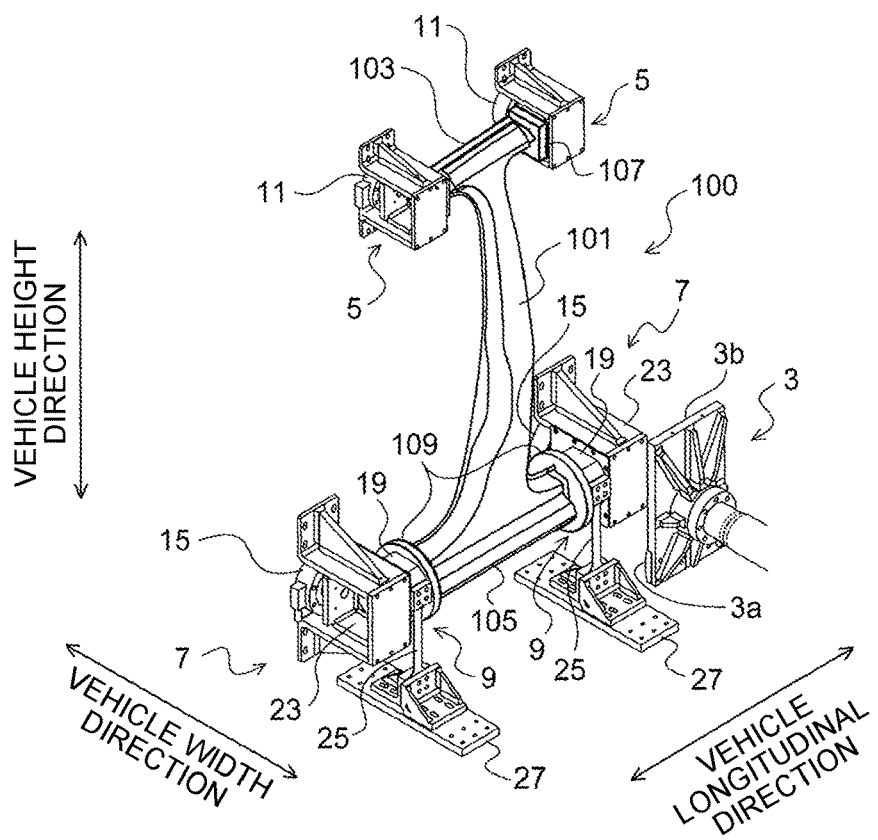
FIG. 4 is a diagram for explaining the configuration of the side crash test apparatus for a center pillar of an automobile according to the first embodiment of the present invention (Part 2).

A side crash test apparatus 1 for a center pillar of an automobile according to a first embodiment of the present invention (hereinafter simply referred to as "side crash test apparatus 1") conducts a side crash test of the center pillar 101 using the crash test structure 100 as illustrated in FIG. 2, and includes, as illustrated in FIG. 1, a striker 3, roof-rail supports 5, rocker supports 7, and the rocker support 7 has a rocker-rotation braking mechanism 9. The following describes each configuration of the foregoing with reference to FIG. 1 to FIG. 6. In order for FIG. 3 to illustrate the configuration of the rocker-rotation braking mechanism 9, and for FIG. 4 to illustrate a state in which the rocker-rotation braking mechanism 9 is supported, FIG. 3 and FIG. 4 illustrate a state in which some of the other constituent elements are removed for the sake of convenience.

Striker

The striker 3 is made to crash into the side of the center pillar 101 in the horizontal direction from the side of the crash test structure 100 (corresponding to the outside of the vehicle in the vehicle width direction) and has a lower punch 3a that simulates the bumper of the other vehicle that crashes into the side of the center pillar from the side of the real vehicle and an upper punch 3b that simulates the vehicle body of the other vehicle.

Roof Rail Support

The roof rail support 5 supports each of the front end and the rear end of the roof-rail simulated part 103. In the side crash test apparatus 1 according to the first embodiment, the roof rail support 5 supports the roof-rail simulated part 103 via the fixing plates 107 (see FIG. 2) joined to each of the front end and the rear end of the roof-rail simulated part 103 so as to restrain the translation of the roof-rail simulated part 103 and the rotation about the axis thereof when the striker 3 is made to crash into the center pillar 101.

In addition, on the roof rail support 5, a load cell 11 (see FIG. 4) for measuring a load when the striker 3 crashed into the side of the center pillar 101, and a roof-rail position adjustment member 13 (see FIG. 1) for adjusting the position of the front end and the rear end of the roof-rail simulated part 103 in the vehicle width direction are provided.

Rocker Support

The rocker support 7 supports each of the front end and the rear end of the rocker simulated part 105 and has the rocker-rotation braking mechanism 9 that, when the striker 3 is made to crash into the side of the center pillar 101, restrains the translation of the rocker simulated part 105 and supports it to be rotatable about the axis thereof and allow braking of the rotation.

On the rocker support 7, a load cell 15 (see FIG. 4) for measuring the load when the striker 3 crashed into the side of the center pillar 101, and a rocker-position adjustment member 17 (see FIG. 1) for adjusting the position of the front end and the rear end of the rocker simulated part 105 in the vehicle width direction are provided.

Rocker-Rotation Braking Mechanism

The rocker-rotation braking mechanism 9 has a rocker-rotation support member 19, a rocker rotation shaft 21 (see FIG. 3), a rocker-rotation shaft support 23, a rocker-rotation braking plate 25, and a rocker-rotation braking plate fixed portion 27.

Rocker-Rotation Support Member

The rocker-rotation support member 19 is a member that is attached to each end face of the front end and the rear end of the rocker simulated part 105 and rotates about the axis thereof together with the rocker simulated part 105 and on which an arc surface 19a (FIG. 3) for which the cross-section orthogonal to the rotation axis of the rotation is arc shaped so that the rocker-rotation braking plate 25 is wound around is formed on at least a part of the outer face. In the first embodiment, the rocker-rotation support member 19 is attached to the disc 109 joined to each of the front end and the rear end of the rocker simulated part 105 so that the rotation axis thereof is coaxial with the center axis of the rocker simulated part 105. The arc surface 19a of the rocker-rotation support member 19 may have the same radius centering the rotation axis.

In the side crash test using the real vehicle of an automobile, some are made to crash at speeds from 30 km/h and, further, exceeding 50 km/h. In crashing at such a high speed, the rotational movement such as torsion of the roof rail and the rocker also becomes high speed.

The rocker-rotation support member 19 and the disc 109 rotate together with the rocker simulated part 105, but if the moment of inertia of the rocker-rotation support member 19 and the disc 109 around such a rotation axis is excessively large, the rotation is delayed as a large braking force is applied when the rocker simulated part 105 tries to rotate in the crash test at high speed, and when stopping the rotation, the deceleration is delayed and the rotational angle is further increased, so that a significant deviation from the rotational behavior such as torsion of the rocker in the side crash test of the real vehicle may arise.

Therefore, as compared with the moment of inertia of the rocker from the rear end of the lower portion of the front pillar to the front end of the lower portion of the rear pillar in the real vehicle, with the longitudinal direction of the vehicle as an axis, the dimensions and materials of the rocker-rotation support member 19 and the disc 109 are selected so that the total moment of inertia of the rocker-rotation support member 19 and the disc 109 in the side crash test apparatus 1 is 10 times or less, more preferably 5 times or less, thereby allowing the destructive phenomenon of the center pillar in the side crash test of the real vehicle to be reproduced successfully.

Rocker Rotation Shaft

The rocker rotation shaft 21 is obtained by, as illustrated in FIG. 3, aligning with the rotation center of the rocker-rotation support member 19.

Rocker-Rotation Shaft Support

The rocker-rotation shaft support 23 rotatably supports the rocker rotation shaft 21, restraining the translation thereof.

Rocker-Rotation Braking Plate

Figure 5:
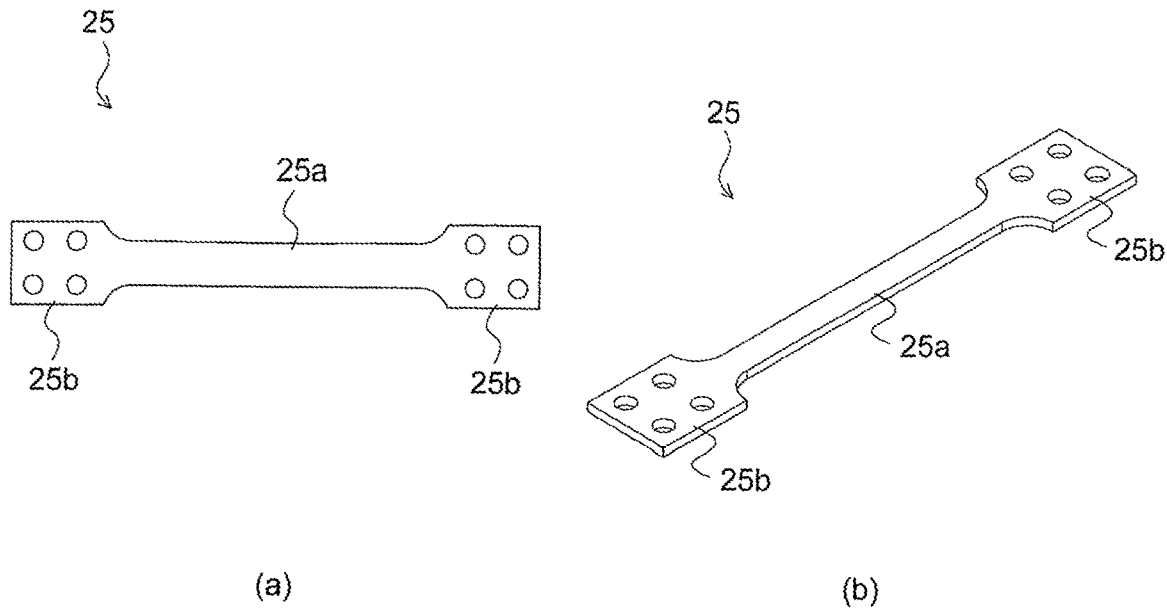
FIG. 5 is a diagram illustrating one example of the shape of a rocker-rotation braking plate used in the side crash test apparatus for a center pillar of an automobile according to the first embodiment of the present invention.

In the rocker-rotation braking plate 25, one end side is attached to the outer face of the rocker-rotation support member 19 and is arranged along the tangential direction of the arc in the arc surface 19a (FIG. 3) and, when the striker 3 is made to crash into the side of the center pillar 101, is pulled and stretched by the rotation of the rocker simulated part 105, thereby braking the rotation, and is wound around the arc surface 19a. In the first embodiment, the rocker-rotation braking plate 25 is, as illustrated in FIG. 5, in a dumbbell shape having a parallel portion 25a and ends 25b in planar view. It is preferable that the rocker-rotation braking plate 25 be arranged in the tangential direction of the arc of the arc surface 19a and the direction orthogonal to the crash direction of the striker 3, as the load in the vehicle height direction at the time of crash can be measured.

Rocker-Rotation Braking Plate Fixed Portion

The rocker-rotation braking plate fixed portion 27 fixes the end 25b (FIG. 5) on the other end side of the rocker-rotation braking plate 25.

Figure 6:
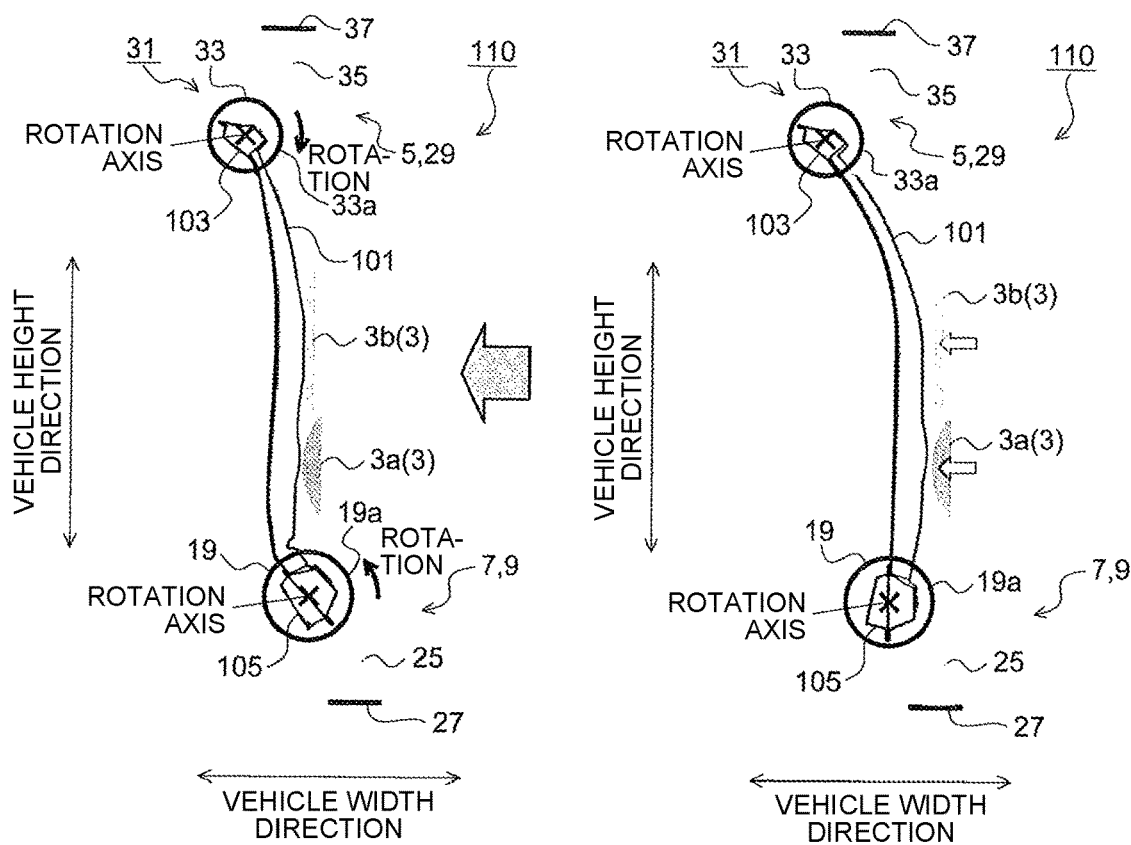
FIG. 6 is a diagram for explaining the action and effect of the side crash test apparatus for a center pillar of an automobile according to the first embodiment of the present invention.

Next, the action and effect of the side crash test apparatus according to the present invention will be described with reference to FIG. 6. FIG. 6 illustrates a side-crash test model 110 that, in a second embodiment of the present invention which will be described later, modeled the crash test structure 100 (FIG. 2) having the center pillar 101 to be the test target of the side crash test, the striker 3, the roof rail support 5, and the rocker support 7 in the side crash test apparatus 1 (FIG. 1), but the function of each constituent element included in the side-crash test model 110 is the same as that of each constituent element of the crash test structure 100 and the side crash test apparatus 1 corresponding to each of the constituent elements.

As illustrated in FIG. 6, when the striker 3 (lower punch 3a, upper punch 3b) is made to crash into the side of the center pillar 101, in the rocker simulated part 105 connected to the lower end of the center pillar 101, because the translation is restrained and being supported to be rotatable about the axis thereof, the rotation toward the inside of the vehicle around the axis occurs.

At this time, as the rocker-rotation braking plate 25 is attached to the outer face of the rocker-rotation support member 19, a load in the tensile direction acts on the rocker-rotation braking plate 25 due to the rotation of the rocker-rotation support member 19. Due to this load in the tensile direction, the rocker-rotation braking plate 25 is extended and the braking is applied to the rotation of the rocker-rotation support member 19. Then, the extended rocker-rotation braking plate 25 is wound around the arc surface 19a along with the rotation of the rocker-rotation support member 19.

As just described, by supporting the front end and the rear end of the rocker simulated part 105 by the rocker supports 7 having the rocker-rotation braking mechanism 9, with a simple mechanism, it is possible to restrain the translation of the rocker simulated part 105, allow it to be rotatable about the axis thereof, and apply the braking to the rotation, so that the destructive phenomenon of the center pillar that arises in the side crash test using the real vehicle can be reproduced.

Moreover, in the side crash test apparatus according to the present invention, by changing the material property, shape, and dimensions of the rocker-rotation braking plate 25 as appropriate, the braking applied to the rotation of the rocker simulated part 105 can be adjusted.

As for the material of the rocker-rotation braking plate 25, it only needs to have a tensile strength that allows it to extend without fracture when a load in the tensile direction acted on the rocker-rotation braking plate 25 due to the rotation of the rocker simulated part 105, and mild steel and oxygen-free copper can be exemplified.

As for the shape of the rocker-rotation braking plate 25, as in the foregoing, in addition to the dumbbell shape in planar view having the parallel portion 25a between the ends 25b and 25b as illustrated in FIG. 5, a rectangle shape having a constant sheet width can be named, and there are no particular restrictions on the shape. However, it is preferable that the shape be such that, when the rocker-rotation support member 19 is rotated, the tensile load acts uniformly to allow braking of the rotation of the rocker-rotation support member 19. Thus, the arc surface 19a of the rocker-rotation support member 19 may have the same radius centering the rotation axis.

From this point of view, in the dumbbell-shaped rocker-rotation braking plate 25, when the striker 3 (FIG. 1) is made to crash into the side of the center pillar 101 in a state where the end 25b on one end side of the dumbbell shape is attached to the rocker-rotation support member 19 and the end 25b on the other end side is fixed to the rocker-rotation braking plate fixed portion 27, the tensile load uniformly acts on the parallel portion 25a (FIG. 5), so that it is preferable as it allows successful braking of the rotation of the rocker-rotation support member 19.

As for the dimensions of the rocker-rotation braking plate 25, it only needs to set the sheet thickness and sheet width so as to avoid fracture against the load in the tensile direction due to the rotation of the rocker-rotation support member 19 and to set the length to extend without fracture.

As just described, as the parameters of the rocker-rotation braking plate 25, by setting the material property, shape, and dimensions as appropriate, the reproducibility of the destructive phenomenon of the center pillar that arises in the real vehicle can be improved. As a result, by small-scaled crash tests without using the real vehicle, the structure and material of the center pillar can be examined, and the number of structural reviews with real vehicles is reduced, so that the development of the body frame structure can be made efficient.

The rocker-rotation braking plates 25 do not need to have the same material properties, shapes, and dimensions on the front end side and the rear end side of the rocker simulated part 105. That is, according to the difference in the rotation about the axes of the front end and the rear end of the rocker in the side crash test of the target vehicle, at least one of the material property, shape, and dimensions of the rocker-rotation braking plates 25 may be made different on the front end side and the rear end side of the rocker simulated part 105.

Figure 7:
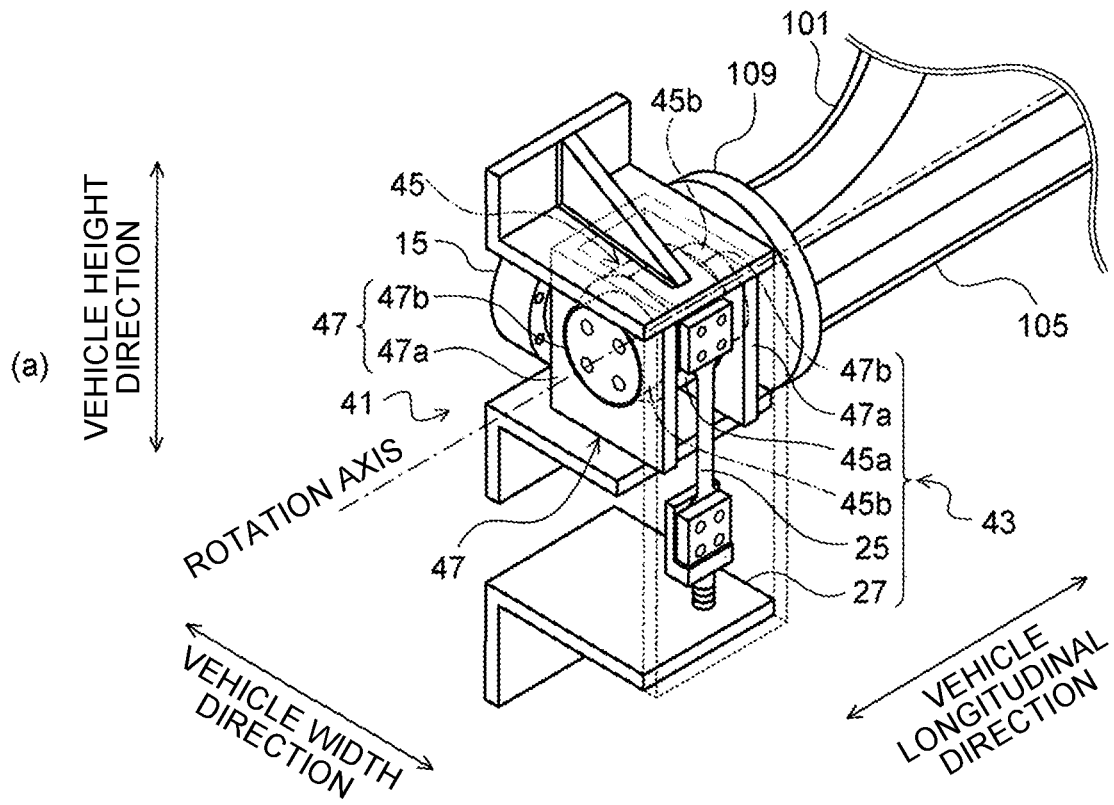
FIG. 7 is a diagram for explaining an example of another configuration of the side crash test apparatus for a center pillar of an automobile according to the first embodiment of the present invention.
Figure 7:
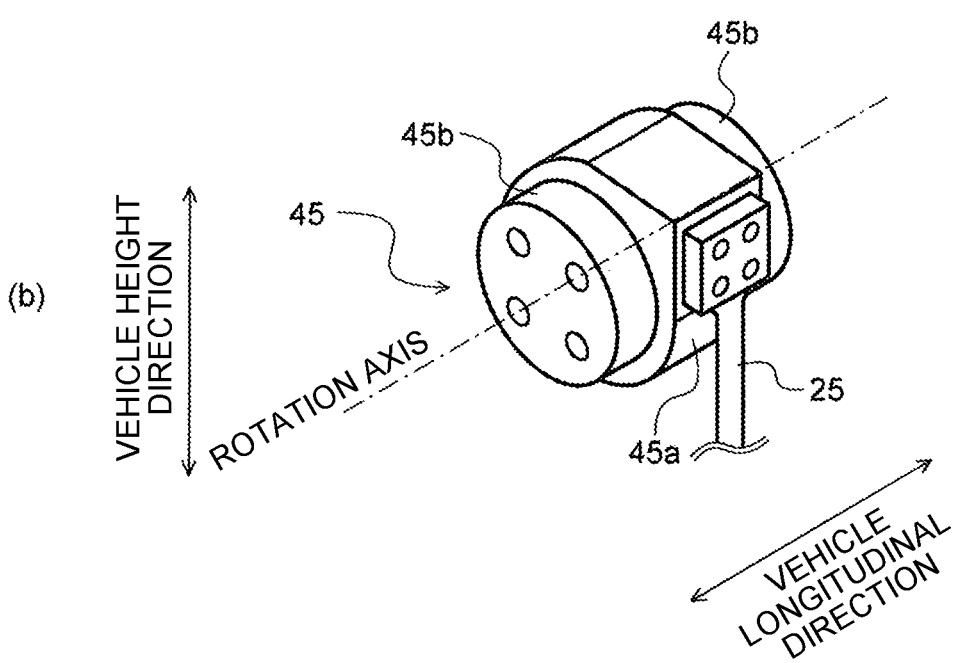

In the description according to the above-described first embodiment, the rocker support 7 and the rocker-rotation braking mechanism 9 have been made up individually, but more preferably, it is better configured that, as illustrated in FIG. 7, a rocker-rotation braking mechanism 43 is built into a rocker support 41. For the convenience of description, FIG. 7 illustrates the rocker support 41 and the rocker-rotation braking mechanism 43 supporting the front end of the rocker simulated part 105 in an enlarged manner, but the same configuration applies to that supporting the rear end of the rocker simulated part 105. In FIG. 7, in order for each constituent element provided in the rocker support 41 to be seen, a part of the rocker support 41 is indicated by dotted lines.

The rocker support 41 supports each of the front end and the rear end of the rocker simulated part 105 and has the rocker-rotation braking mechanism 43 that, when the striker 3 is made to crash into the side of the center pillar 101, restrains the translation of the rocker simulated part 105 and supports it to be rotatable about the axis thereof and allow braking of the rotation.

The rocker-rotation braking mechanism 43 has a rocker-rotation support member 45, a rocker-rotation shaft support 47, the rocker-rotation braking plate 25, and the rocker-rotation braking plate fixed portion 27.

The rocker-rotation support member 45 is, as with the above-described rocker-rotation support member 19 (see FIG. 3), attached to the disc 109 joined to each of the front end and the rear end of the rocker simulated part 105 and rotates about the axis together with the rocker simulated part 105 and, as illustrated in FIG. 7(b), has an arc surface 45a (see arc surface 19a in FIG. 3) that is formed so that the rocker-rotation braking plate 25 attached to the outer face of the central portion in the vehicle longitudinal direction winds around and circumferential faces 45b for which the outer faces on both ends in the vehicle longitudinal direction are formed in a circumferential face form.

The rocker-rotation shaft support 47 supports, in place of the above-described rocker rotation shaft 21 (see FIG. 3), the circumferential faces 45b on both ends of the rocker-rotation support member 45 in the vehicle longitudinal direction to be rotatable while restraining the translation thereof and is a substantially U-shaped member having support plate members 47a that support the circumferential faces 45b. Then, the rocker-rotation support member 45 is arranged on the inside of the substantially U-shaped rocker-rotation shaft support 47, and the circumferential face 45b of the rocker-rotation support member 45 is penetrated to a hole 47b of the support plate member 47a, so that the rocker-rotation support member 45 is supported to be rotatable while the translation thereof is restrained.

In the other configuration of the first embodiment as illustrated in FIG. 7, the point where the axis of the load cell 15 in the vehicle width direction is connected to the rocker-rotation shaft support 47, that is, the fulcrum that supports load in the horizontal direction acting on the rocker simulated part 105 due to the crash with the striker 3, and the point where the rocker-rotation braking plate 25 is fixed to the rocker-rotation support member 45, that is, the point of action where the braking force in the vehicle height direction is acted on the rotation of the rocker simulated part 105, can be set to the same position in the vehicle longitudinal direction.

In this way, the rocker support load acting in the vehicle width direction and the rocker rotation braking load acting in the vehicle height direction act on the point matched as viewed from the crash direction of the striker 3, so that the rotation and torsion other than about the rotation axis of the rocker simulated part 105 can be suppressed and the rotation of the rocker simulated part 105 can be made closer to the movement of the rocker in the crash test of the real vehicle.

In the side crash test apparatus 1 according to the above-described first embodiment, while the rocker support 7 supporting the rocker simulated part 105 was supported so as to restrain the translation of the front end and the rear end of the rocker simulated part 105 and to be rotatable about the axis thereof, the roof rail support 5 supporting the roof-rail simulated part 103 was supported so as to restrain both the translation and the rotation of the front end and the rear end of the roof-rail simulated part 103.

However, in the side crash test apparatus according to the present invention, as schematically illustrated in FIG. 6, a roof rail support 29 that supports the front end and the rear end of the roof-rail simulated part 103 may have a roof-rail rotation braking mechanism 31 that restrains the translation of the roof-rail simulated part 103 and supports it to be rotatable about the axis thereof and allow braking of the rotation.

The roof-rail rotation braking mechanism 31 has, as with the foregoing rocker-rotation braking mechanism 9, a roof-rail rotation support member 33, a roof-rail rotation shaft (not illustrated), a roof-rail rotation shaft support (not illustrated), a roof-rail rotation braking plate 35, and a roof-rail rotation braking plate fixed portion 37.

The roof-rail rotation support member 33 is a member that is attached to each end face of the front end and the rear end of the roof-rail simulated part 103, rotates about the axis together with the roof-rail simulated part 103, and on at least a part of the outer face, an arc surface 33a (FIG. 6) for which the cross-section orthogonal to the rotation axis of the rotation is arc-shaped is formed.

The roof-rail rotation shaft protrudes outward in the rotation axis direction from the rotation center of the roof-rail rotation support member 33. The roof-rail rotation shaft support rotatably supports the roof-rail rotation shaft, restraining the translation thereof.

In the roof-rail rotation braking plate 35, one end side is attached to the outer face of the roof-rail rotation support member 33 and is arranged along the tangential direction of the arc in the arc surface 33a and, by extending due to the rotation of the roof-rail simulated part 103 when the striker 3 is made to crash into the side of the center pillar 101, applies braking to the rotation and is wound around the arc surface 33a. Examples of the shape of the roof-rail rotation braking plate 35 include a dumbbell shape (see FIG. 5) and a rectangle shape. Then, the roof-rail rotation braking plate fixed portion 37 fixes the other end side of the roof-rail rotation braking plate 35. It is preferable that the roof-rail rotation braking plate 35 be arranged in the tangential direction of the arc of the arc surface 33a and the direction orthogonal to the crash direction of the striker 3, as the load in the vehicle height direction at the time of crash can be measured.

As just described, in addition to supporting the front end and the rear end of the rocker simulated part 105 by the rocker supports 7 having the rocker-rotation braking mechanism 9, by supporting the front end and the rear end of the roof-rail simulated part 103 by the roof rail supports 5 having the roof-rail rotation braking mechanism 31, it is possible, when the striker 3 crashed into the center pillar 101 of the crash test structure 100, to restrain the translation of the roof-rail simulated part 103 and to allow it to be rotatable about the axis thereof and apply braking to the rotation, so that the reproducibility of the destructive phenomenon of the center pillar that arises in the side crash test using the real vehicle can be further improved.

In the side crash test apparatus according to the present invention, as with the rocker-rotation braking plate 25, by changing the material property, shape, and dimensions of the roof-rail rotation braking plate 35 as appropriate, the braking applied to the rotation of the roof-rail simulated part 103 can be adjusted.

Moreover, the roof-rail rotation braking plates 35 do not need to have the same material properties, shapes, and dimensions on the front end side and the rear end side of the roof-rail simulated part 103. That is, according to the difference in the rotation about the axes of the front end and rear end of the roof rail in the side crash test of the target vehicle, at least one of the material properties, shapes, and dimensions of the roof-rail rotation braking plates 35 may be made different on the front end side and the rear end side of the roof-rail simulated part 103.

In the side crash test apparatus according to the present invention, as illustrated in FIG. 1, by providing the load cells 11 and the load cells 15 on each of the roof rail supports 5 and the rocker supports 7, the load in the vehicle width direction, which is difficult in the test of the real vehicle, at the time of side crash of the center pillar 101 can be acquired. In addition, by providing the load cell on the rocker-rotation braking plate fixed portion 27 and/or the roof-rail rotation braking plate fixed portion 37 illustrated in FIG. 6, the load in the vehicle height direction at the time of side crash can also be acquired.

In particular, in the present invention, the rocker-rotation braking plate 25 in the rocker-rotation braking mechanism 9 of the rocker support 7 is arranged in the tangential direction of the arc surface 19a of the rocker-rotation support member 19. Moreover, in the roof rail support 5 having the roof-rail rotation braking mechanism 31, the roof-rail rotation braking plate 35 is arranged in the tangential direction of the arc surface 19a of the rocker-rotation support member 19 and the direction orthogonal to the crash direction of the striker 3. Thus, eliminating the influence of the braking of the rotation of the rocker-rotation support member 19 by the rocker-rotation braking plate 25 and the braking of the rotation of the roof-rail rotation support member 33 by the roof-rail rotation braking plate 35, the load at the time of side crash of the center pillar 101 can be acquired. Then, based on the acquired load, the information useful for examining and selecting the structure and material of the center pillar can be obtained.

The side crash test apparatus according to the present invention is preferable to be configured (not illustrated) so that, even if it supports the roof-rail simulated part 103 as illustrated in FIG. 6, the roof-rail rotation braking mechanism be built into the roof rail support as illustrated in the foregoing FIG. 7.

In the above description, the disc 109 has been joined to each of the front end and the rear end of the rocker simulated part 105 and the rocker-rotation support member 19 has been attached to the disc 109, but in the present invention, the rocker-rotation support member 19 may be directly joined to each of the front end and the rear end of the rocker simulated part 105 without the disc 109 interposed therebetween.

Similarly, even in a case that the roof rail support 5 has the roof-rail rotation braking mechanism 31 as illustrated in FIG. 6, the roof-rail rotation support member 33 may be directly joined to each of the front end and the rear end of the roof-rail simulated part 103, without joining the fixing plates 107 to the front end and the rear end of the roof-rail simulated part 103.

Second Embodiment

Figure 8:
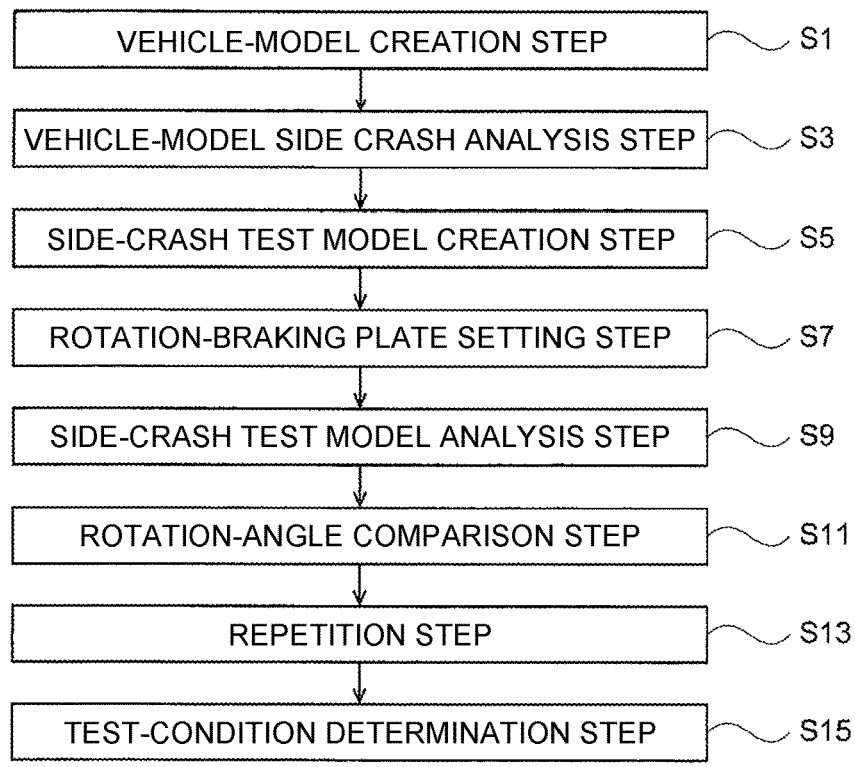
FIG. 8 is a diagram for explaining a side crash test condition determination method for a center pillar of an automobile according to a second embodiment of the present invention.

A side crash test condition determining method for a center pillar of an automobile according to a second embodiment of the present invention is a method of determining the material property, shape, and dimensions of the rocker-rotation braking plate 25 as test conditions of side crash test, when conducting the side crash test of the center pillar 101 by the side crash test apparatus 1 according to the above-described first embodiment, and includes, as illustrated in FIG. 8, vehicle-model creation step S1, vehicle-model side crash analysis step S3, side-crash test model creation step S5, rotation-braking plate setting step S7, side-crash test model analysis step S9, rotation-angle comparison step S11, repetition step S13, and test-condition determination step S15. The following describes each of the above-described steps with reference to FIG. 1 to FIG. 6 described in the foregoing first embodiment.

Vehicle-Model Creation Step

The vehicle-model creation step S1 is a step to create a vehicle model that modeled the real vehicle of an automobile. In the creation of the vehicle model, it only needs to mesh the geometry of the real vehicle of an automobile into three-dimensional elements and/or two-dimensional elements.

Vehicle-Model Side Crash Analysis Step S3

The vehicle-model side crash analysis step S3 is a step to perform side crash analysis in which, from the side of the vehicle model created at the vehicle-model creation step S1, a model of a striking body such as another vehicle is made to crash into the side of the center pillar of the vehicle model, and acquire a rotation angle around the axis of the rocker in the vehicle model by the side crash analysis. At the vehicle-model side crash analysis step S3, the side crash analysis only needs to be performed by the finite element method (FEM) analysis.

Side-crash Test Model Creation Step S5

The side-crash test model creation step S5 is a step to create a side-crash test model 110 (see FIG. 6) that modeled the crash test structure 100 including the center pillar 101 that is the test target of the side crash test as illustrated in FIG. 1, and the side crash test apparatus 1 that conducts the side crash test of the center pillar 101.

The side-crash test model 110 is created by meshing the crash test structure 100 and the side crash test apparatus 1 into three-dimensional elements and/or two-dimensional elements. The modeling of the side crash test apparatus 1 does not need to model all constituent elements of the side crash test apparatus 1 and it only needs to model at least the striker 3, the roof rail support 5, and the rocker support 7 that has the rocker-rotation braking mechanism 9.

In the creation of the side-crash test model 110, at the side-crash test model analysis step S9 which will be described later, if the translation of the roof-rail simulated part 103 and the rocker simulated part 105 are restrained, the rotation about the axes thereof, and the braking thereof are possible, each constituent element of the side crash test apparatus 1 may be modeled in a simplified shape as illustrated in FIG. 6.

Rotation-Braking Plate Setting Step S7

The rotation-braking plate setting step S7 is a step to set the material property, shape, and dimensions of the rocker-rotation braking plate 25 in the side-crash test model 110 created at the side-crash test model creation step S5. Examples of the material property of the rocker-rotation braking plate 25 include material, material strength, and the like, examples of the shape include a rectangle shape and a dumbbell shape (see FIG. 5), and examples of the dimensions include sheet width, sheet thickness, and the like.

Side-Crash Test Model Analysis Step S9

The side-crash test model analysis step S9 is a step to perform side crash analysis in which, from the side of the side-crash test model 110, the striker 3 is made to crash into the side of the center pillar 101, and acquire the rotation angle of the rocker simulated part 105 of the side-crash test model 110. At the side-crash test model analysis step S9, the side crash analysis of the side-crash test model 110 only needs to be performed by the FEM analysis.

Rotation-Angle Comparison Step S11

The rotation-angle comparison step S11 is a step to compare the rotation angle of the rocker acquired at the vehicle-model side crash analysis step S3 with the rotation angle of the rocker simulated part 105 acquired at the side-crash test model analysis step S9.

Repetition Step S13

The repetition step S13 is a step to repeatedly perform the rotation-braking plate setting step S7, the side-crash test model analysis step S9, and the rotation-angle comparison step S11, until the rotation angles compared at the rotation-angle comparison step S11 are in a predetermined range by changing the material property, shape, and dimensions of the rocker-rotation braking plate 25. The predetermined range is a case where the rotation angle is within ±0.5°, for example.

Test-Condition Determination Step S15

The test-condition determination step S15 is a step to determine, as the test conditions of the side crash test of the center pillar 101 using the side crash test apparatus 1, the material property, shape, and dimensions of the rocker-rotation braking plate 25 at the time the rotation angle of the rocker simulated part 105 of the side-crash test model 110 is in a predetermined range with respect to the rotation angle of the rocker of the vehicle model.

According to the side crash test condition determination method for a center pillar of an automobile in the second embodiment, the material property, shape, and dimensions as the parameters of the rocker-rotation braking plate 25 used in the side crash test apparatus 1 in the foregoing first embodiment have been determined as the test conditions of the side crash test using the side crash test apparatus 1, so that it is possible to successfully reproduce the destructive phenomenon of the center pillar that arises in the side crash test of the real vehicle, with a simpler mechanism and simpler condition adjustment. As a result, by small-scaled side crash tests without using the real vehicle, the structure and material of the center pillar can be examined and selected and the number of structural reviews of real vehicles is reduced, so that the development of the body frame structure can be made efficient.

The rocker-rotation braking plate 25 for which the parameters are set at the rotation-braking plate setting step may be configured by stacking two or more metal sheets having different material strengths, or by further joining the stacked metal sheets. Moreover, the metal sheets to be stacked are not limited to those of the same material (for example, copper sheets, steel sheets) and may be of different materials (for example, copper sheet and steel sheet), and the combination of the material, shape, and dimensions of the metal sheets to be stacked may be selected as appropriate.

In the above description, the parameters of the rocker-rotation braking plate 25 have been determined as the side crash test conditions but, assuming that the roof-rail simulated part 103 is supported by the roof rail support 5 having the roof-rail rotation braking mechanism 31 as illustrated in FIG. 6, the parameters of the roof-rail rotation braking plate 35 only need to be determined, according to the rotation angle of the roof rail at the time of side crash of the real vehicle, in the same manner as the above-described procedure for determining the parameters of the rocker-rotation braking plate 25.

Specifically, first, at the vehicle-model side crash analysis step S3, the rotation angle around the axis of the roof rail in the vehicle model is acquired. Then, by creating the side-crash test model 110 for which the front end and the rear end of the roof-rail simulated part 103 are supported by the roof rail supports 5 having the roof-rail rotation braking mechanism 31 as illustrated in FIG. 6, and by performing the side crash analysis of the created side-crash test model 110, the rotation angle around the axis of the roof-rail simulated part 103 is acquired.

Then, by comparing the rotation angle of the roof rail acquired at the vehicle-model side crash analysis step S3 with the rotation angle of the roof-rail simulated part 103 acquired at the side-crash test model analysis step S9, and until the compared rotation angles are in a predetermined range, while changing the material property, shape, and dimensions of the roof-rail rotation braking plate 35, the rotation-braking plate setting step S7, the side-crash test model analysis step S9, and the rotation-angle comparison step S11 are repeatedly performed. When the rotation angles compared at the rotation-angle comparison step S11 are within the predetermined range, the material property, shape, and dimensions of the roof-rail rotation braking plate 35 at that time are determined as the test conditions of the side crash test of the center pillar 101 using the side crash test apparatus 1.

EXAMPLES

Specific experiments to confirm the action and effect of the present invention were conducted, and this will be described below.

First Example

Figure 9:
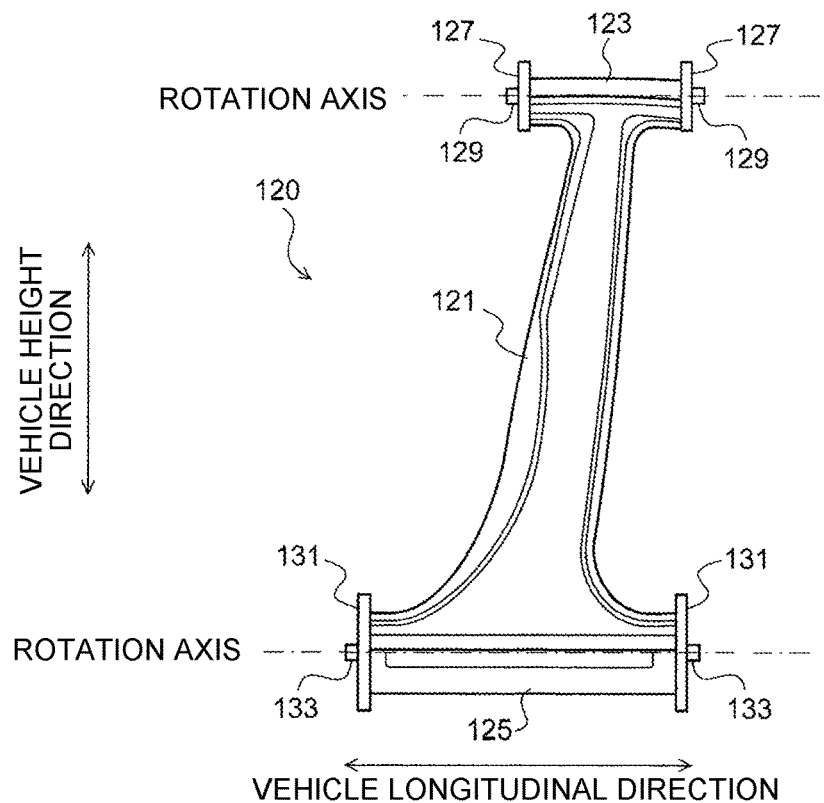
FIG. 9 is a diagram illustrating a crash test structure having a center pillar that was a subject of side crash tests in a first example and a second example.

In a first example, as illustrated in FIG. 9, using as a test target a crash test structure 120 having a center pillar 121 of a commercial vehicle, a roof-rail simulated part 123 connected to the upper end thereof, and a rocker simulated part 125 connected to the lower end thereof, the side crashworthiness of the center pillar was evaluated.

In the crash test structure 120, the roof-rail simulated part 123 is obtained by cutting the roof rail of the above-described commercial vehicle at a cross-section perpendicular to the vehicle longitudinal direction in front and rear of the portion connected to the center pillar 121, and disc-shaped roof-rail rotation support members 127 are joined to the front end and the rear end of the roof-rail simulated part 123 and the roof-rail rotation support members 127 are each provided with a roof-rail rotation shaft 129 projecting outward from the rotation center thereof.

Similarly, the rocker simulated part 125 is obtained by cutting the rocker of the above-described commercial vehicle at a cross-section perpendicular to the vehicle longitudinal direction in front and rear of the portion connected to the center pillar 121, and disc-shaped rocker-rotation support members 131 are joined to the front end and the rear end of the rocker simulated part 125 and the rocker-rotation support members 131 are each provided with a rocker rotation shaft 133 projecting outward from the rotation center thereof.

Then, one end side of a rocker-rotation braking plate that is a rectangle shape metal sheet having a sheet width of 25 mm is attached on the outer peripheral surface of each of the rocker-rotation support members 131, and the other end side of the rocker-rotation braking plate is fixed, so that the rotation of the rocker-rotation support members 131 is braked.

In the commercially available real vehicle that was the test target in the first example, in the crash test result conducted under the side crash test conditions of the U.S. IIHS, the intrusion of the door hinge (upper side) of the center pillar was 125 mm and the rotation angles of the roof rail and the rocker were 3° and 24°, respectively.

As just described, because the rotation angle of the roof rail is as small as 3°, in the first example, the roof-rail simulated part 123 of the crash test structure 120 was to be supported by the roof rail support 5 (see FIG. 1) that restrains the translation and the rotation of the roof-rail rotation support members 127 joined to the front end and the rear end thereof.

Meanwhile, as for the rocker simulated part 125, it was to be supported using the rocker supports 7 (see FIG. 1) having the rocker-rotation braking mechanisms 9 that restrain the translation of the rocker-rotation support members 131 and support the rocker-rotation support members 131 to be rotatable. Thus, the side crash test model that includes the rocker-rotation braking plates attached to the outer faces of the rocker-rotation support members and the rocker-rotation braking plate fixed portions that fix the rocker-rotation braking plates, in addition to the striker 3, the crash test structure 120, and the rocker-rotation support members 131, was created.

Then, the FEM analysis in which the striker 3 is made to crash into the side of the center pillar 121 was performed, and the rotation angle of the rocker-rotation support member attached to the rocker simulated part was obtained. In the first example, the FEM analyses of the side crash tests were conducted while changing the material and thickness of the rocker-rotation braking plate that brakes the rotation of the rocker-rotation support members 131. Table 1 indicates the material and sheet thickness set as the parameters of the rocker-rotation braking plate.

TABLE 1

| | Rocker-rotation braking plate (rectangle shape) | | Rotation angle | |
|---|---|---|---|---|
| Symbol | Material | Sheet thickness | Roof rail | Rocker |
| Real vehicle | — | — | 3° | 24° |
| No. 1 | None | None | 0° | 50° |
| No. 2 | Oxygen-free copper | 2 mm | 0° | 36° |
| No. 3 | Oxygen-free copper | 4 mm | 0° | 24° |
| No. 4 | Oxygen-free copper | 6 mm | 0° | 16° |
| No. 5 | Mild steel | 2.3 mm | 0° | 29° |
| No. 6 | Mild steel | 2.8 mm | 0° | 24° |
| No. 7 | Mild steel | 3.2 mm | 0° | 21° |

The "real vehicle" in Table 1 is one for which the side crash test of the real vehicle was conducted and the rotation angles of the roof rail and the rocker of the vehicle were obtained. Meanwhile, "No. 1" to "No. 7" in Table 1 are the results, obtained by the FEM analyses using the side crash test model that modeled the crash test structure 120, of the rotation angles of the roof-rail rotation support members 127 and the rocker-rotation support members 131, the roof-rail rotation support members 127 being attached to the respective end faces of the front end and the rear end of the roof-rail simulated part 123 and the rocker-rotation support members 131 being attached to the respective end faces of the front end and the rear end of the rocker simulated part 125. Then, "No. 1" is one for which the rocker-rotation braking plates were not attached to the rocker-rotation support members 131 neither, and the rocker simulated part 125 was to be rotatable freely without applying the braking to the rotation about the axis thereof. "No. 2" to "No. 7" are ones for which the rocker-rotation braking plates were attached to the rocker-rotation support members 131, and the braking was applied to the rotation about the axis of the rocker simulated part 125. Then, "No. 2" to "No. 4" are ones for which the sheet thickness was changed with the material of the rocker-rotation braking plate being oxygen-free copper, and "No. 5" to "No. 7" are ones for which the sheet thickness was changed with the material of the rocker-rotation braking plate being mild steel.

The foregoing Table 1 indicates the results of the rotation angle obtained in the side crash tests. From Table 1, in the case of No. 1 where no braking was applied to the rotation of the rocker simulated part 125, it is found that the rotation of the rocker simulated part 125 was excessive as compared with the real vehicle. Meanwhile, in any of the cases of No. 2 to No. 4 for which the material of the rocker-rotation braking plate was oxygen-free copper and the cases of No. 5 to No. 7 with mild steel, it is found that the braking applied to the rotation of the rocker simulated part 125 was increased by increasing the sheet thickness and that the rotation angle of the rocker simulated part 125 became small.

Then, as the parameters of the rocker-rotation braking plate that substantially matches the rotation angle) (=24°) of the rocker in the side crash test of the real vehicle, (a) oxygen-free copper of a sheet width 25 mm×sheet thickness 4 mm or (b) mild steel of a sheet width 25 mm×sheet thickness 2.8 mm were determined.

Figure 10:
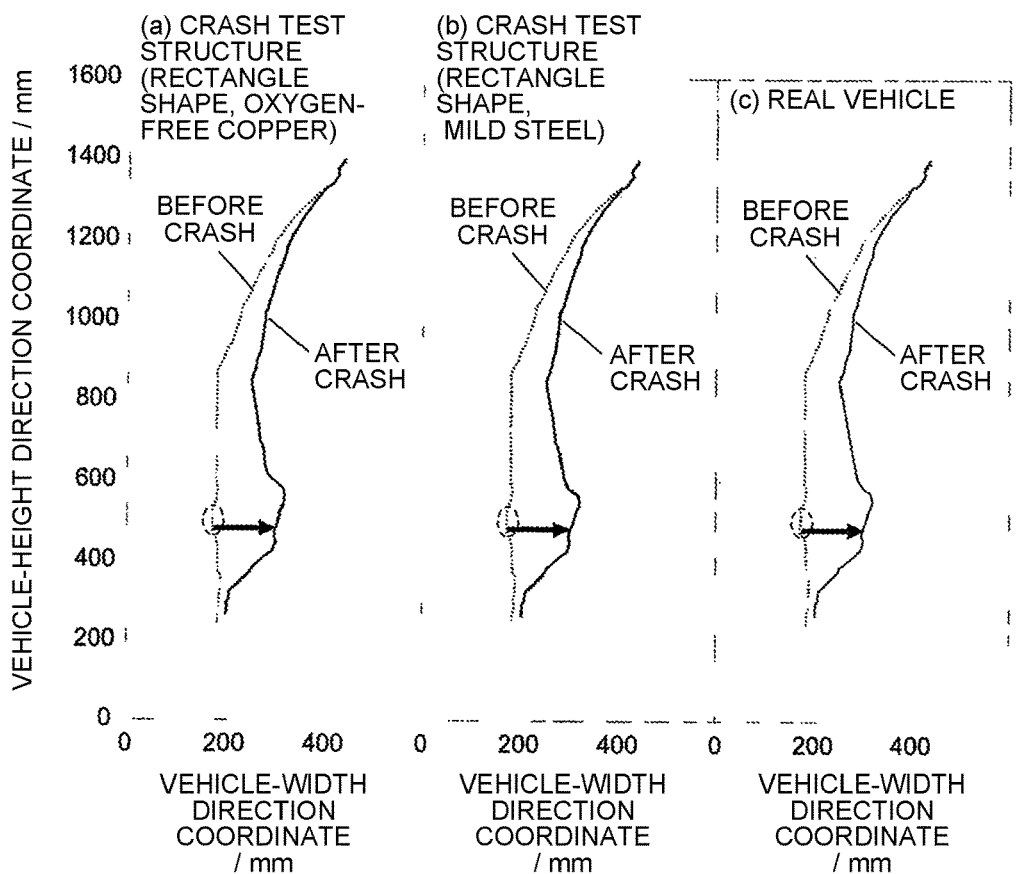
FIG. 10 is a cross-sectional view illustrating, in the first example, the deformation of the center pillar in the side crash tests ((a) crash test structure (rocker-rotation braking plate: rectangle shape, oxygen-free copper), (b) crash test structure (rocker-rotation braking plate: rectangle shape metal sheet, mild steel), (c) real vehicle).

FIG. 10 illustrates the deformed shapes of the center pillar obtained by the side crash tests. FIGS. 10(*a*) and (*b*) are deformed shapes of the center pillar 121 by the FEM analyses of the side-crash test model that modeled the crash test structure 120 and (*c*) is a deformed shape of the center pillar by the side crash test of the real vehicle.

From FIG. 10, the deformed shape of the center pillar 121 in the side-crash test model substantially matched with the deformed shape of the center pillar of the real vehicle. Thus, according to the present invention, even in the side crash test of the center pillar 121 using the crash test structure 120, it is found that the destructive phenomenon of the center pillar in the side crash test of the real vehicle can be reproduced successfully.

Figure 11:
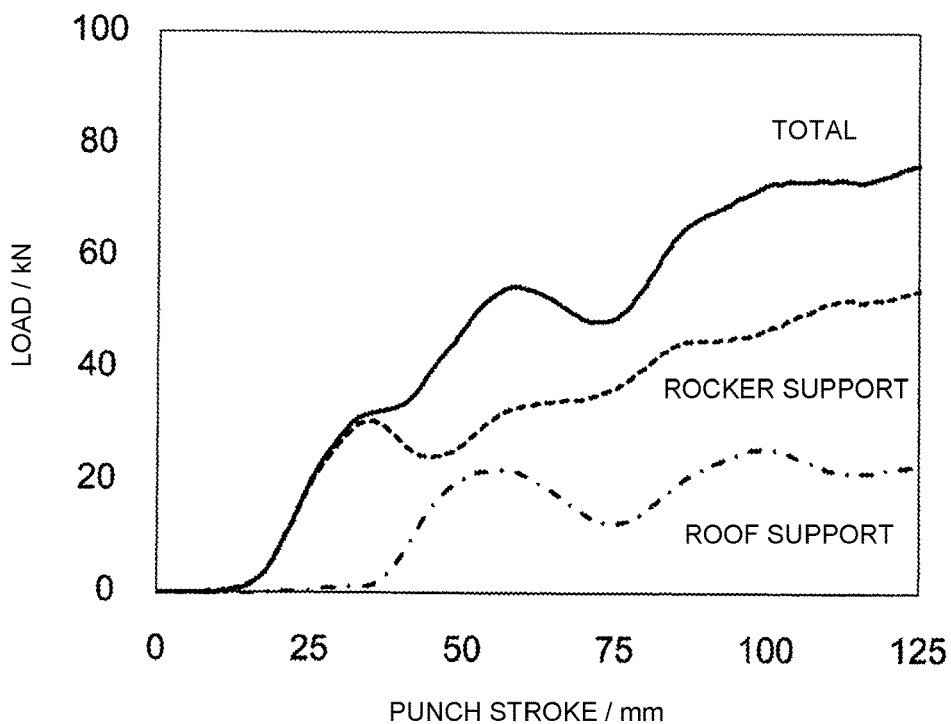
FIG. 11 is a graph of a load, in the first example, measured in the crash test of the crash test structure by the side crash test apparatus according to the present invention.

FIG. 11 illustrates FEM analysis results of the load applied to the roof rail support and the rocker support when the rocker-rotation braking plate in the side-crash test model was oxygen-free copper of a sheet width 25 mm×sheet thickness 4 mm. In FIG. 11, the abscissa axis represents the punch stroke (amount of movement in the vehicle width direction) of the striker and the ordinate axis represents the load applied to each of the roof rail support and the rocker support and the total of the measured loads.

From FIG. 11, it was indicated that it is possible to estimate the load during side crash of the center pillar 121 that is difficult to measure in the side crash test of the real vehicle. Then, from the result of the load applied to the center pillar during side crash, the information useful for examining and selecting the structure and material of the center pillar can be obtained.

Second Example

In a second example, based on the results obtained in the first example by the side crash test condition determination method for a center pillar of an automobile according to the present invention, the side crash test of the crash test structure 120 illustrated in FIG. 9 using a dumbbell-shaped metal sheet as the rocker-rotation braking plate in the side crash test apparatus 1 was performed, and the destructive phenomenon of the center pillar 121 and the rotation angle of the rocker simulated part 125 were evaluated.

The rocker-rotation braking plate 25 used in the second example was a dumbbell-shaped metal sheet having the parallel portion 25*a* illustrated in FIG. 5, and was fabricated with respective materials of oxygen-free copper having the parallel portion 25*a* of a sheet width 25 mm×sheet thickness 4 mm and mild steel having the parallel portion 25*a* of a sheet width 25 mm×sheet thickness 2.8 mm.

Then, each end of the fabricated dumbbell-shaped rocker-rotation braking plate 25 was attached to the outer peripheral surface of the disc-shaped rocker-rotation support member 131. In the second example, the side crash tests were conducted using the side crash test apparatus 1 illustrated in FIG. 1.

The crash test structure 120 was of the same structures and materials as those of the center pillar 121, the roof-rail simulated part 123, and the rocker simulated part 125 used in the FEM analyses of the side crash tests in the first example.

Table 2 indicates the results of the rotation angle of the rocker simulated part 125 at the time the intrusion of the door hinge (upper side) of the center pillar 121 reached 125 mm.

TABLE 2

| | Rocker-rotation braking plate (dumbbell shape) | | Rotation angle | |
|---|---|---|---|---|
| Symbol | Material | Sheet thickness | Roof rail | Rocker |
| Real vehicle | — | — | 3° | 24° |
| First example | Oxygen-free copper | 4 mm | 0° | 24° |
| Second example | Mild steel | 2.8 mm | 0° | 25° |

The rotation angle of the rocker-rotation support members 131 attached to the end faces of the front end and the rear end of the rocker simulated part 125 was 25°, and it substantially matched with the result of the real vehicle illustrated in the foregoing first example and the result of the FEM analysis for which the rocker-rotation braking plate was of the rectangle shape metal sheet.

Figure 12:
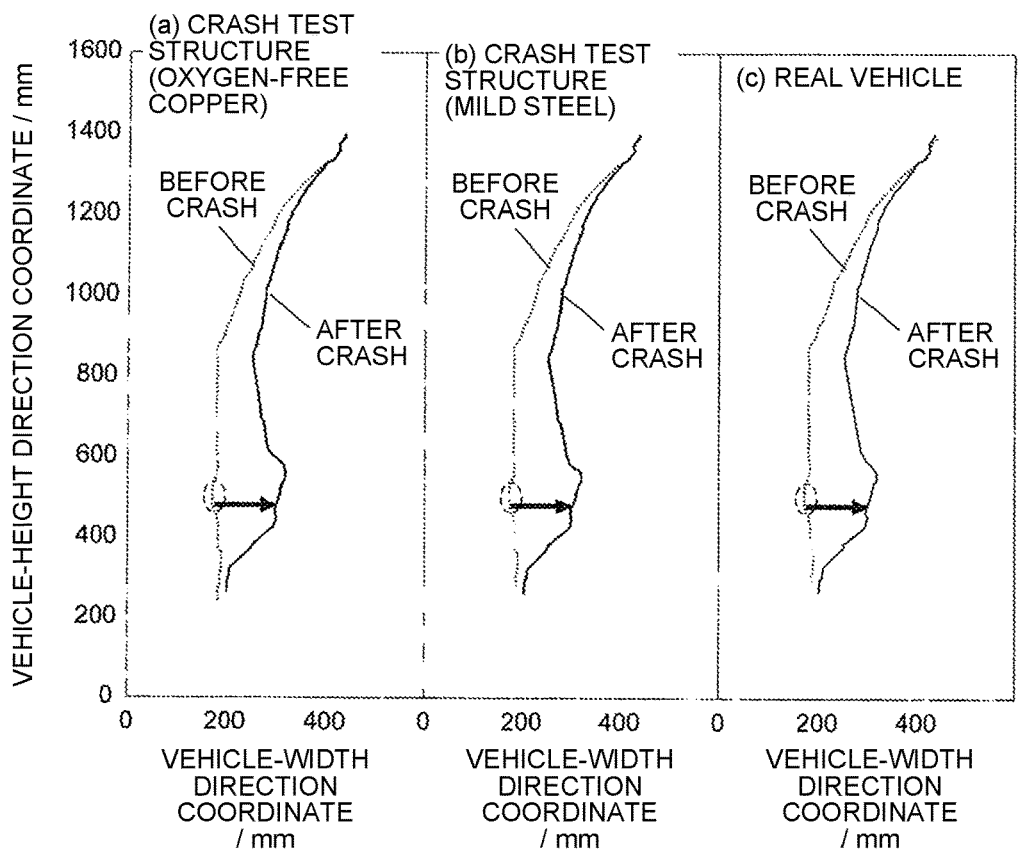
FIG. 12 is a cross-sectional view illustrating, in the second example, the deformation of the center pillar in the side crash tests ((a) crash test structure (rocker-rotation braking plate: dumbbell shape, oxygen-free copper), (b) crash test structure (rocker-rotation braking plate: dumbbell shape, mild steel), (c) real vehicle).

In addition, the deformed shapes of the center pillar in the side crash tests, as illustrated in FIG. 12, also substantially matched with the result of the side crash test of the real vehicle.

Figure 13:
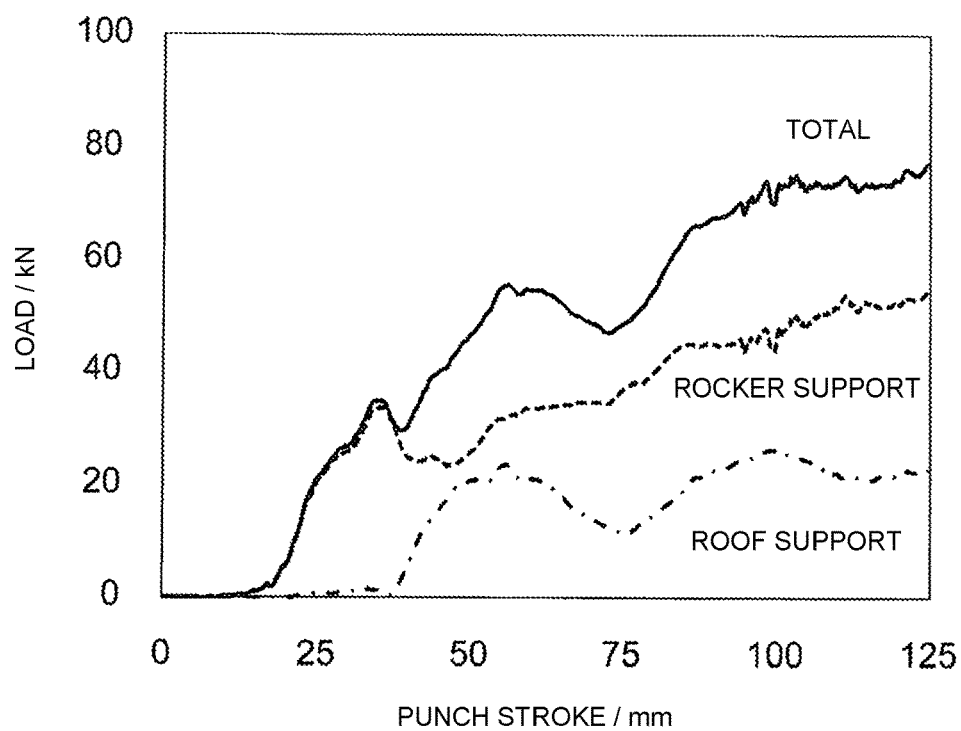
FIG. 13 is a graph of the load, in the second example, measured in the crash test of the crash test structure by the side crash test apparatus according to the present invention.

Moreover, FIG. 13 illustrates the results of the load applied to the roof rail support and the rocker support measured by the load cells, in the side crash test of the crash test structure 120 using the side crash test apparatus 1, when the rocker-rotation braking plate was of oxygen-free copper having a width 25 mm×thickness 4 mm. In FIG. 13, the abscissa axis represents the punch stroke (amount of movement in the vehicle width direction) of the striker and the ordinate axis represents the load measured at each of the roof rail support and the rocker support and the total of the measured loads.

From FIG. 13, it was confirmed that the measurement results of the load applied to the roof-rail simulated part and the rocker simulated part in the crash test structure using the side crash test apparatus according to the present invention substantially matched with the analysis results of the loads obtained by the FEM analyses illustrated in FIG. 11, and further that, even when the dumbbell-shaped metal sheet was used as the rocker-rotation braking plate, it is possible to make the restraint conditions of the crash test structure appropriate and to successfully reproduce the destructive phenomenon of the center pillar in the side crash test using the real vehicle.

INDUSTRIAL APPLICABILITY

According to the present invention, it is possible to provide a side crash test apparatus and a side crash test condition determination method for a center pillar of an automobile, being capable of reproducing the destructive phenomenon of the center pillar that arises in the side crash test of a real vehicle by a simpler mechanism and simpler condition adjustment.

REFERENCE SIGNS LIST

1 SIDE CRASH TEST APPARATUS
3 STRIKER
3a LOWER PUNCH
3b UPPER PUNCH
5 ROOF RAIL SUPPORT
7 ROCKER SUPPORT
9 ROCKER-ROTATION BRAKING MECHANISM
11 LOAD CELL
13 ROOF-RAIL POSITION ADJUSTMENT MEMBER
15 LOAD CELL
17 ROCKER-POSITION ADJUSTMENT MEMBER
19 ROCKER-ROTATION SUPPORT MEMBER
19a ARC SURFACE
21 ROCKER ROTATION SHAFT
23 ROCKER-ROTATION SHAFT SUPPORT
25 ROCKER-ROTATION BRAKING PLATE
27 ROCKER-ROTATION BRAKING PLATE FIXED PORTION
29 ROOF RAIL SUPPORT
31 ROOF-RAIL ROTATION BRAKING MECHANISM
33 ROOF-RAIL ROTATION SUPPORT MEMBER
33a ARC SURFACE
35 ROOF-RAIL ROTATION BRAKING PLATE
37 ROOF-RAIL ROTATION BRAKING PLATE FIXED PORTION
41 ROCKER SUPPORT
43 ROCKER-ROTATION BRAKING MECHANISM
45 ROCKER-ROTATION SUPPORT MEMBER
45a ARC SURFACE
45b CIRCUMFERENTIAL FACE
47 ROCKER-ROTATION SHAFT SUPPORT
47a SUPPORT PLATE MEMBER
47b HOLE
100 CRASH TEST STRUCTURE
101 CENTER PILLAR
101a UPPER PORTION
101b LOWER PORTION
103 ROOF-RAIL SIMULATED PART
105 ROCKER SIMULATED PART
107 FIXING PLATE
109 DISC
110 SIDE-CRASH TEST MODEL
120 CRASH TEST STRUCTURE
121 CENTER PILLAR
123 ROOF-RAIL SIMULATED PART
125 ROCKER SIMULATED PART
127 ROOF-RAIL ROTATION SUPPORT MEMBER
129 ROOF-RAIL ROTATION SHAFT
131 ROCKER-ROTATION SUPPORT MEMBER
133 ROCKER ROTATION SHAFT

The invention claimed is:

1. A side crash test apparatus for a center pillar of an automobile, the side crash test apparatus conducting a side crash test of the center pillar using a crash test structure including: the center pillar of the automobile; a roof-rail simulated part connected to an upper end of the center pillar and simulating a roof rail of the automobile; and a rocker simulated part connected to a lower end of the center pillar and simulating a rocker of the automobile, the side crash test apparatus comprising:
a striker configured to crash into a side of the center pillar;
a roof rail support configured to support each of a front end and a rear end of the roof-rail simulated part; and
a rocker support configured to support each of a front end and a rear end of the rocker simulated part, wherein
the rocker support includes a rocker-rotation braking mechanism configured to
restrain, when the striker crashes into the center pillar, translation of the rocker simulated part, and
support the rocker simulated part to be rotatable about an axis thereof and allow braking of the rotation, and
the rocker-rotation braking mechanism includes
a rocker-rotation support member attached to an end face of the rocker simulated part, configured to rotate about the axis together with the rocker simulated part, and having an arc surface formed on at least a part of an outer face, a rocker-rotation shaft support configured to support a rotation center of the rocker-rotation support member to be rotatable while restraining translation thereof,
a rocker-rotation braking plate for which one end side is attached to the outer face of the rocker-rotation support member and that is arranged along a tangential direction of the arc surface and, when the striker crashes into the center pillar, is extended by rotation of the rocker-rotation support member while braking the rotation and is wound around the arc surface, and
a rocker-rotation braking plate fixed portion configured to fix another end side of the rocker-rotation braking plate.

2. The side crash test apparatus for the center pillar of the automobile according to claim 1, wherein
the roof rail support includes a roof-rail rotation braking mechanism configured to restrain, when the striker crashes into the center pillar, translation of the roof-rail simulated part and to support the roof-rail simulated part to be rotatable about an axis thereof and allow braking of the rotation, and
the roof-rail rotation braking mechanism includes
a roof-rail rotation support member attached to an end face of the roof-rail simulated part, configured to rotate about the axis together with the roof-rail simulated part, and having an arc surface formed on at least a part of an outer face,
a roof-rail rotation shaft support configured to support a rotation center of the roof-rail rotation support member to be rotatable while restraining translation thereof,
a roof-rail rotation braking plate for which one end side is attached to the outer face of the roof-rail rotation support member and that is arranged along a tangential direction of the arc surface and, when the striker crashes into the center pillar, is extended by rotation of the roof-rail rotation support member while braking the rotation and is wound around the arc surface, and
a roof-rail rotation braking plate fixed portion configured to fix another end side of the roof-rail rotation braking plate.

3. The side crash test apparatus for the center pillar of the automobile according to claim 2, wherein at least one of material property, shape, and dimensions of the roof-rail rotation braking plate in the roof-rail rotation braking mechanism is made different on a front end side and a rear end side of the roof-rail simulated part.

4. The side crash test apparatus for a center pillar of an automobile according to claim 1, wherein at least one of material property, shape, and dimensions of the rocker-rotation braking plate in the rocker-rotation braking mechanism is made different on a front end side and a rear end side of the rocker simulated part.

5. A side crash test condition determination method for the center pillar of the automobile that determines material property, shape, and dimensions of the rocker-rotation braking plate used in the side crash test apparatus for the center pillar of the automobile according to claim 1 as test conditions, the side crash test condition determination method comprising:
- a vehicle-model creation step of creating a vehicle model that modeled the automobile;
- a vehicle-model side crash analysis step of, by performing side crash analysis in which a striking body crashes into the side of the center pillar from a side of the vehicle model, acquiring a rotation angle around the axis of the rocker of the automobile in the vehicle model by the side crash analysis;
- a side-crash test model creation step of creating a side-crash test model that modeled the crash test structure and the side crash test apparatus;
- a rotation-braking plate setting step of setting material property, shape, and dimensions of the rocker-rotation braking plate in the side-crash test model;
- a side-crash test model analysis step of, by performing side crash analysis in which a striker crashes into the center pillar of the side-crash test model, acquiring a rotation angle of the rocker simulated part;
- a rotation-angle comparison step of comparing the rotation angle of the rocker acquired at the vehicle-model side crash analysis step with the rotation angle of the rocker simulated part acquired at the side-crash test model analysis step;
- a repetition step of repeatedly performing the rotation-braking plate setting step, the side-crash test model analysis step, and the rotation-angle comparison step, until the rotation angles compared at the rotation-angle comparison step are in a predetermined range by changing the material property, shape, and dimensions of the rocker-rotation braking plate; and
- a test-condition determination step of determining, as test conditions, the material property, shape, and dimensions of the rocker-rotation braking plate in a case where the compared rotation angle of the rocker simulated part and the rotation angle of the rocker are in the predetermined range at the repetition step.

* * * * *